Aug. 11, 1931.          C. SAURER          1,818,758
NONMETALLIC CONNECTION
Filed Jan. 7, 1928
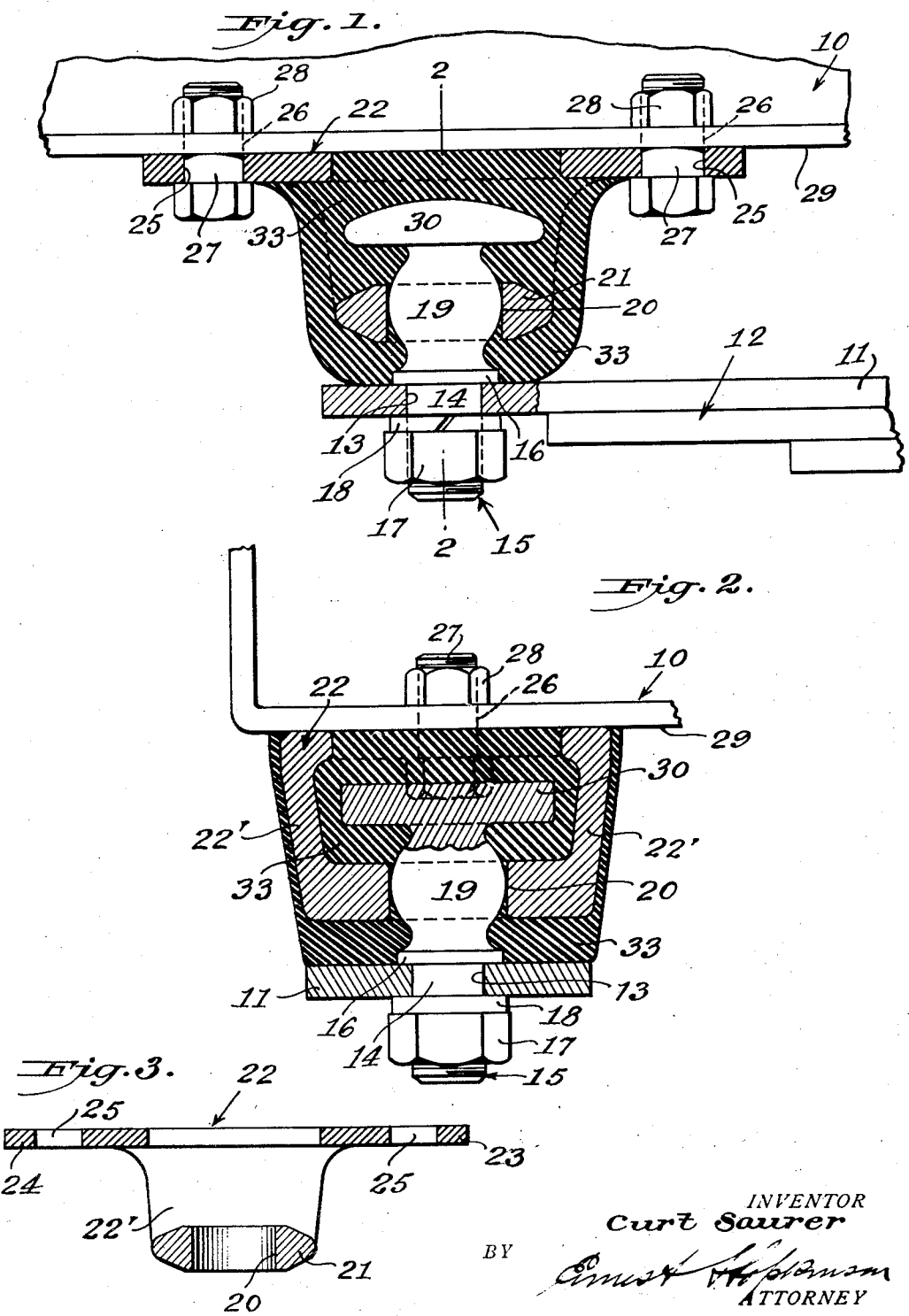
INVENTOR
Curt Saurer
BY
ATTORNEY Patented Aug. 11, 1931

1,818,758

UNITED STATES PATENT OFFICE

CURT SAURER, OF CLEVELAND, OHIO, ASSIGNOR TO THE MECHANICAL RUBBER COMPANY, OF CLEVELAND, OHIO, A CORPORATION OF NEW JERSEY

NONMETALLIC CONNECTION

Application filed January 7, 1928. Serial No. 245,140.

This invention relates to cushion connections or shackles for vehicle springs, and particularly to those employing a non-metallic insulating medium between the ends of the springs and the chassis frame.

The invention has particular reference to a connection of the above noted character adapted to take the place of the metal-to-metal pivot commonly used at the fixed end of springs of motor vehicles. One of the disadvantages of the metal-to-metal pivot arises through the fact that abrasives work in between the metal surfaces, resulting in excessive wear and noise. Furthermore, the all-metal connections are unable to absorb or prevent the conduction of vibration which in the case of motor vehicles are usually of high frequency, tending to shorten the life of the springs, cause crystallization of the metallic parts, and produce noises in the body of the car.

It is an object of the present invention to overcome the foregoing disadvantages and to provide a pivotal connection between the fixed end of the spring and the chassis frame while insulating the parts of the shackle against noise and the transmission of vibration, and to do away with the usual lubricants. The invention, however, is not limited to use in the foregoing connection but may have broad application in any situation where it is desired to insulate and prevent the transmission of vibrations and noises between any two relatively movable or vibrating parts and at the same time provide a substantial mechanical connection between the parts.

Another object of the invention is to prevent excessive spring deflection, and to reduce the tortional strain on the leaves of the springs, which may occur when there is any angularity between the axle of the vehicle and the frame.

Another object is to provide means for insuring a positive mechanical connection between the spring and the frame, even in the event of disruption or complete failure of the insulating medium, thereby assuring maximum safety.

The shackle is constructed in the form of a self-contained unit and is readily attachable by simply providing two small perforations in the frame and a single perforation in the main spring leaf respectively, for a pair of bolts and a lug which extends from the body of the shackle.

Other features and advantages will appear as the description proceeds.

In the acompanying drawings:

Fig. 1 is a vertical section through the shackle, illustrating one practical embodiment of my invention;

Fig. 2 is a transverse section on the line 2—2 of Fig. 1; and

Fig. 3 is a detail, in section, of a bracket, or housing forming a part of the shackle.

In the drawing, the numeral 10 indicates the chassis frame of a vehicle to which the fixed end of the main leaf 11 of a spring 12 is to be secured. According to the common practice heretofore, the main spring leaf 11 has been formed with an eye for the reception of a pivot pin carried by a bracket attached to the chassis frame 10. Many objections have arisen to the use of such mechanical connection, due to the fact that it is difficult to lubricate and that abrasives work into the bearing surfaces and cause wear which results in looseness and noise in operation of the vehicle. Also, the danger of breakage at this point is increased due to the looseness of the connections after a comparatively short period of use, necessitating constant readjustment or renewal. Instead of forming the main leaf 11 with an eye, it is proposed in the present invention to provide a single perforation 13 adjacent the fixed end of the spring leaf for reception of the shank 14 of the stud 15 having a shoulder 16 which is adapted to be drawn up tightly against the top surface of the main spring leaf 11 by means of a nut 17 held against the loosening as by a lock washer 18. The upper portion of the stud 15 is preferably formed with a ball 19 which is received in a socket 20 provided in the bottom 21 of a bracket or housing 22 having side walls 22' and being open at the front and the rear as illustrated in Fig. 3. The housing 22 may also include forwardly and rearwardly extending attaching flanges 23 and 24 respectively, having perforations 25 which are adapted to register with corresponding perforations 26 in the chassis frame 10. Suitable fasteners such as bolts 27 pass through the perforations 25 and 26 and are provided with nuts 28 to secure the housing 22 to the lower face 29 of the frame 10. Above the ball portion 19 the stud 15 is provided with an enlarged head 30 which is enclosed between side walls 22' of the housing 22. A suitable vibration insulating medium such as rubber 33 is filled in and molded around the described metallic parts in a manner to completely embed the same and form an elastic mechanical connection between the chassis frame 10 and the spring leaf 11. The rubber also fills in the narrow spaces between the ball 19 and the walls of the socket 20 and acts as a lubricant during motion between these parts. It will be seen from a consideration especially of Fig. 1, that the ball 19 is located very close to the plane of the main spring leaf 11, so that as the spring 12 deflects during travel of the vehicle, the spring leaf 11 pivots about the center of the ball 19 in practically the same manner as it would if the spring were equipped with an eye and attached to the frame by a pivot pin. Due to the fact that the housing 22 is open at the front and the rear, that is, lengthwise of the spring, and closed at its sides by the walls 22', the head 30 has relatively free action forwardly and rearwardly during spring deflection, but due to the confining of the head 30 by the oppositely disposed side walls 22' of the housing, any angular motion of the stud 15 in a transverse direction is restricted within predetermined limits. The parts may be so proportioned that the degree of motion allowed in the transverse direction is sufficient to reduce torsional stress in the leaves of the spring arising from angularity between the axle of the vehicle and the frame, but insufficient to permit side sway of the vehicle body. Furthermore, the restraining action of the rubber 33 in the longitudinal direction of motion of the head 30 prevents excessive spring deflection.

In manufacturing this shackle, the metallic parts are assembled, unvulcanized rubber is applied to the parts, and the whole assembly then placed in a mold and vulcanized. This securely bonds the moving parts together and provides a protective covering therefor. The shackle also assumes the form of a unit which may be quickly installed and provides a strong mechanical connection between the spring and the frame. In the event of failure of the rubber 33, the metal parts cannot come apart due to the fact that the head 30 is larger than the socket opening 20, and would be retained by the bottom portion 21, thus insuring safety in operation.

It is to be understood that the invention is not confined to use as a spring shackle but may have application in any situation where it is desired to provide a vibration-dampening and shock insulating connection between relatively movable parts.

Having thus described my invention what I claim and desire to protect by Letters Patent is:

1. A combined insulating and vibration-dampening device for connecting relatively movable parts, comprising a member attached to one part, a member attached to another part, vibration-dampening material bonding said members together and forming an insulation between said members, the latter also including means for universally connecting them together at a point relatively close to one of said parts.

2. A combined insulating and vibration-dampening device for connecting relatively movable parts, comprising a member attached to one part, a member attached to another part, vibration-dampening material joining and forming an insulation between said members, one of said members being arranged to receive and form a guide for vertical motion of the other member, said guide being also adapted to permit angular motion of said other member in all directions.

3. A combined insulating and vibration-dampening device for connecting a leaf spring to a vehicle frame, comprising a member attached to the frame, a member attached to the spring, vibration-dampening material joining and forming an insulation between said members, one of said members being arranged to receive and form a guide for vertical and all directional angular motion of the other member, and means for restricting said angular motion laterally of said spring while permitting relatively greater angular motion longitudinally thereof.

4. A combined insulating and vibration-dampening device for connecting relatively movable parts, comprising a member secured to one of said parts, said member having oppositely disposed side walls connected by a bridge, the bridge having an aperture therein, a stud secured to another part and including a head disposed between the walls of said bridge, said stud also including a rounded portion disposed in said aperture and forming therewith a universal joint, and vibration-dampening insulating material filling the member and surrounding the stud therewithin.

5. A combined insulating and vibration-dampening device for connecting relatively movable parts, comprising a member secured to one of said parts, a member secured to another part, the members including means for universally connecting them together at a point relatively close to the plane of the motion of one of said parts, and vibration-dampening insulating material embedding said members to held them in cooperative working relation.

6. A combined insulating and vibration-dampening device for connecting relatively movable parts, comprising a member secured to one of said parts, a member secured to another part, means for pivotally connecting said members together at a point relatively close to the plane of motion of one of said parts, and vibration-dampening insulating material bonding the members together and also insulating them from each other.

7. A combined insulating and vibration-dampening device for connecting relatively movable parts, comprising a member secured to one part, a member secured to another part, the members including means for universally connecting them together at a point relatively close to the plane of motion of one of said members, and vibration-dampening material insulating said members from each other and yieldingly bonding them together.

8. A combined insulating and vibration-dampening device for connecting relatively movable parts, comprising a housing adapted to be secured to one of the parts, a member secured to another part and including a head localized within the housing vibration-dampening insulating material surrounding the head and filling the housing, and a combined reciprocable and pivotal connection between said member and housing, said insulating material coacting with said head to yieldingly resist motion of said member with respect to said housing.

9. A combined insulating and vibration-dampening device for connecting relatively movable parts, comprising a housing secured to one of said parts, a member secured to another part, said member including a headed portion disposed within the housing, said member and the housing also including means for universally connecting them together, and vibration-dampening insulating material filling the housing and embedding the head and the universal connection, said insulating material also providing lubrication between the opposed surfaces of the universal connection.

10. A combined insulating and vibration-dampening device for connecting relatively movable parts, comprising a housing adapted to be secured to one of said parts, a member secured to another part, said member including a headed portion disposed within the housing, said member also including a ball, the housing having a socket for the ball and forming therewith a universal connection, and vibration-deadening insulating material filling the housing and surrounding the headed portion and the ball and socket, said connection being relatively close to the one of said parts to which it is secured.

11. A combined insulating and vibration-dampening device for connecting relatively movable parts, including in combination a member secured to each of said parts, and vibration-dampening material arranged to insulate said parts from each other, said parts including a ball and socket connection permitting bodily movement of the ball through the socket and rocking engagement therewith.

12. A combined insulating and vibration-dampening device for connecting relatively movable parts, including in combination, a member secured to each of said parts, and vibration-dampening material adapted to insulate said parts from each other and bond them together, said parts including a ball and socket connection permitting bodily movement of the ball through the socket while rockingly engaging the same.

13. As a new article of manufacture, a connection comprising a housing open at its opposite sides and provided with an aperture in one of its end walls, said housing being adapted to be secured to one of the relatively movable parts, a member adapted to be secured to the other relatively movable part having a headed portion within the housing, and a shank portion carrying the headed portion and secured to the other movable part, said shank portion being shaped intermediately to rockingly engage the aperture in said housing and non-metallic means yieldingly holding the member and housing in cooperative working relation.

14. A shackle comprising relatively movable members, one of which is provided with an aperture and the other with a ball portion adapted to form with said aperture a pivotal connection between the members, rubber composition arranged to bond said members together and maintain said ball portion in cooperative working relation with the walls of said aperture, said rubber composition also providing lubrication between the ball and the walls.

15. A flexible connection for connecting a leaf spring to a vehicle frame, comprising a member secured to said frame, and a member secured adjacent the end of said leaf spring, said members forming a universal connection, the first named member having oppositely disposed side walls extending lengthwise of the spring and having no walls transversely of said spring, the second member having a headed portion disposed between the walls, and vibration-dampening insulating material embedding said members and holding the same in cooperative working relation.

16. A non-metallic connection, comprising a housing, a member including a ball portion guided by said housing, said member also including an enlarged portion disposed inwardly of said housing from the ball portion, and means for connecting said members respectively to relatively movable parts.

Signed at Cleveland, county of Cuyahoga, State of Ohio this 30th day of December, 1927.

CURT SAURER.